(12) United States Patent
Bade

(10) Patent No.: US 12,530,575 B2
(45) Date of Patent: Jan. 20, 2026

(54) INTELLIGENT AND ADAPTIVE COMPLEX EVENT PROCESSOR FOR A CLOUD-BASED PLATFORM

(71) Applicant: BANK OF AMERICA CORPORATION, Charlotte, NC (US)

(72) Inventor: Vinay Laxmikant Bade, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1135 days.

(21) Appl. No.: 17/345,352

(22) Filed: Jun. 11, 2021

(65) Prior Publication Data

US 2022/0398447 A1   Dec. 15, 2022

(51) Int. Cl.
*G06N 3/08* (2023.01)
*G06N 3/044* (2023.01)

(52) U.S. Cl.
CPC ............... *G06N 3/08* (2013.01); *G06N 3/044* (2023.01)

(58) Field of Classification Search
CPC ........ G06N 3/044; G06N 3/0442; G06N 3/08; G06N 3/0895; G06N 3/09; G06N 3/091; G06N 3/092; G06N 3/094; G06N 3/096; G06N 3/0985

See application file for complete search history.

(56) References Cited

U.S. PATENT DOCUMENTS

| | | | |
|---|---|---|---|
| 10,070,164 B2 | 9/2018 | Li et al. | |
| 11,232,367 B1* | 1/2022 | Silberstein | G06N 7/01 |
| 11,367,149 B2 | 6/2022 | Marculescu et al. | |
| 11,494,661 B2 | 11/2022 | Wu et al. | |
| 2014/0136295 A1 | 5/2014 | Wasser | |
| 2018/0268286 A1* | 9/2018 | Dasgupta | G06N 3/084 |
| 2019/0379589 A1 | 12/2019 | Ryan et al. | |
| 2021/0056430 A1* | 2/2021 | Wu | G06N 3/006 |
| 2021/0109789 A1 | 4/2021 | Mcweeney | |
| 2021/0303969 A1 | 9/2021 | Amiri et al. | |
| 2022/0051275 A1 | 2/2022 | Crutcher et al. | |
| 2022/0253745 A1 | 8/2022 | Achar et al. | |
| 2022/0383150 A1 | 12/2022 | Le et al. | |
| 2022/0383324 A1 | 12/2022 | Sheshadri et al. | |
| 2023/0153355 A1 | 5/2023 | Crabtree et al. | |
| 2023/0252267 A1 | 8/2023 | Saleh et al. | |
| 2023/0334300 A1 | 10/2023 | Banerjee et al. | |
| 2023/0334360 A1* | 10/2023 | Kormilitsin | G06F 18/2115 |

* cited by examiner

*Primary Examiner* — Kamran Afshar
*Assistant Examiner* — Kurt Nicholas Pressly
(74) *Attorney, Agent, or Firm* — Moore & Van Allen PLLC; Anup Iyer

(57) ABSTRACT

Streaming data channels are configured to inject time series-based data sets into a private cloud platform at which complex event processing engines implementing a recurrent neural network using a Nonlinear Autoregressive Moving-Average (NARMA) model identifies patterns in the data sets to continuously determine future/predictive data points for each data set. The dynamic future/predictive data points/values serve as inputs to machine learning engines, which implement multi variate regression analysis to derive a dynamic variable value for a mechanism.

13 Claims, 5 Drawing Sheets

INTELLIGENT AND ADAPTIVE COMPLEX EVENT PROCESSOR FOR A CLOUD-BASED PLATFORM

FIELD OF THE INVENTION

The present invention is generally directed to data processing and, more specifically, cloud-based implementation of complex event processing engines on time series based data sets to determine dynamic predictive data points and implementation of machine learning engines to derive time series-based dynamic/real-time value variables for a mechanism.

BACKGROUND

Private cloud-based information technology platform hosting is becoming increasing prevalent amongst many industries who engage in data processing due to private cloud computing being more conducive to data security and information protection.

As the ability to accumulate vast quantities of data from a myriad of different data sources increasing, so to does the need to process the data in an efficient and timely manner. Big data processing is a set of techniques or programming models to access large-scale data to extract useful information for supporting and providing real-time or near-time decisions.

Many big data processing models involve time-series data sets, in which each time interval (e.g., milliseconds or the like) in the time series defines a data point, which varies over time. The challenge exists with processing such data so as to render meaningful outputs.

Therefore, a need exists to be able to develop systems, methods and computer program products that process data sets, including time series-based data sets across diverse and complex data sources to render effective, real-time data outputs.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by cloud-based implementation of complex event processing engines on time series based data sets to determine dynamic predictive data points and implementation of machine learning engines to derive time series based dynamic/real-time value variables for a mechanism.

As a means of receiving time-series data sets that require consumption/processing at high-speed (i.e., millions of messages per minute rate), the present invention provides for data streaming channels to act as data injectors for providing time series based and other data sets to a privately hosted cloud computing platform. As previously discussed, the private cloud-based computing platform affords heightened data security.

The cloud computing platform implements complex event processing (CEP) engine(s) to identify patterns in the streaming time series data sets and determine dynamic future/predicted data points for the data sets based on the patterns. In specific embodiments of the invention, the CEP implements a recurrent neural network using a highly accurate Nonlinear Autoregressive Moving-Average (NARMA) model for forecasting/predicting the time series data. The dependency of the prior state of the data series means that by leveraging a feedback loop within the recurrent neural network the next forecasted data point/value can be derived for the time series data set.

In addition, the cloud-based computing platform implements machine learning engines, in specific embodiments of the invention, multi variate regression analysis algorithm(s), which use multiple input parameters as decision making parameters for the value variable being determined/predicted. The various inputs parameters, which include the forecasted data points/values of the various time series-based data sets and other intervention parameters are assigned dynamic weighting factors for the multi variate regression analysis, The interpretation of the multivariate model provides the impact for each independent variable/input parameter on the dependent variable (i.e., predicted value of a mechanism).

A system for determining a dynamic derived value variable for a mechanism defines first embodiments of the invention. The system includes a cloud computing platform having a cloud-based memory and at least one cloud-based processing device in communication with the memory. Additionally, the system includes a plurality of data streaming channels in communication with the cloud computing platform. Each data streaming channel is configured to stream one of a plurality of time series-based data sets to the cloud computing platform. Each of the time series-based data sets are associated with a value of a mechanism. Further, each time interval in the time series of a corresponding time series-based data set defines a data point in the data set.

The system additionally includes one or more complex event processing engines that are stored in the cloud-based memory and executed by the least one cloud-based processing device on each of the time series-based data sets to identify one or more patterns and continuously derive a future data point for a corresponding time series data set based at least on the one or more patterns. Additionally, the system includes one or more machine-learning engines stored in the memory and executed by the least one processing device to determine the dynamic derived value variable for the mechanism based at least on the continuously derived future data points for the plurality of time series-based data sets.

In specific embodiments of the system, the one or more complex event processing engines further implement a plurality of recurrent neural networks executed by the at least one cloud-based processing device. Each recurrent neural network receives from one of the data streaming channels a corresponding one of the time series-based data sets to identify the one or more patterns and continuously derive the future data point for the corresponding time series data set. In related embodiments of the system, the plurality of recurrent neural networks implement at least one Nonlinear Autoregressive Moving-Average (NARMA) model on the time series-based data sets to identify the one or more patterns and continuously derive the future data point for the corresponding time series data set. In further related embodiments of the system, each of the plurality of recurrent neural networks further comprise a feedback loop to account for historical data dependency of the data points in the time series-based data sets.

In other specific embodiments of the system, the one or more machine-learning engines implement one or more multi-variate regression analysis algorithms that are configured to determine the dynamic derived value variable for the mechanism based at least on the continuously derived future data points for the plurality of time series-based data sets. In related embodiments of the system, the multi-variate regression analysis algorithms are configured to determine and assign dynamic weighting factors to each of the continuously derived future data points for the plurality of time series-based data sets to determine the dynamic derived value variable for the mechanism. The dynamic weighting factor indicates a level of importance of a corresponding time series-based data sets at points in time.

In further specific embodiments the system further includes a second computing platform including a second memory and at least one second processing device in communication with the second memory. In such embodiments the system further includes an offer determining engine that is stored in the second memory and executed by the at least one second processing device to determine an offer value for the mechanism. The offer value covers a predetermined time period and is based at least on the dynamic derived value variable.

A computer-implemented method for determining a dynamic derived value variable for a mechanism defines second embodiments of the invention. The method is executed by one or more cloud-based computing processors. The method includes receiving, over a plurality of data streaming channels, a plurality of time series-based data sets. Each of the time series-based data sets is associated with a value of a mechanism. Each time interval in the time series of a corresponding time series-based data set defines a data point in the data set. Additionally, the method includes implementing complex event processing on each of the time series-based data sets to identify one or more patterns and continuously derive a future data point for a corresponding time series data set based at least on the one or more patterns. Further, the method includes implementing machine learning to determine the dynamic derived value variable for the mechanism based at least on the continuously derived future data points for the plurality of time series-based data sets.

In specific embodiments of the computer-implemented method, implementing complex event processing further includes implementing a plurality of recurrent neural networks. Each recurrent neural network receiving from one of the data streaming channels a corresponding one of the time series-based data sets to identify the one or more patterns and continuously derive the future data point for the corresponding time series data set. In related embodiments of the computer-related method, implementing the plurality of recurrent neural networks further includes executing at least one Nonlinear Autoregressive Moving-Average (NARMA) model on the time series-based data sets to identify the one or more patterns and continuously derive the future data point for the corresponding time series data set. In other related embodiments of the computer-implemented method, implementing the plurality of recurrent neural networks further comprises feeding back the derived future data points as inputs to the NARMA model to account for historical data dependency of the data points in the time series-based data sets.

In other specific embodiments of the computer-implemented method, implementing machine learning further includes implementing one or more multi-variate regression analysis algorithms to determine the dynamic derived value variable for the mechanism based at least on the continuously derived future data points for the plurality of time series-based data sets. In related embodiments of the computer-implemented method, implementing the one or more multi-variate regression analysis algorithms further includes determining and assigning dynamic weighting factors to each of the continuously derived future data points for the plurality of time series-based data sets to determine the dynamic derived value variable for the mechanism. The dynamic weighting factor indicates a level of importance of a corresponding time series-based data sets at points in time.

A computer program product including a non-transitory computer-readable medium defines third embodiments of the invention. The computer-readable medium includes a first set of codes for causing a computer to receive, over a plurality of data streaming channels, a plurality of time series-based data sets. Each of the time series-based data sets is associated with a value of a mechanism. Each time interval in the time series of a corresponding time series-based data set defines a data point in the data set. The computer-readable medium additionally includes a second set of codes for causing a computer to implement complex event processing on each of the time series-based data sets to identify one or more patterns and continuously derive a future data point for a corresponding time series data set based at least on the one or more patterns. Further, the computer-readable medium includes a third set of codes for causing a computer to implement machine learning to determine the dynamic derived value variable for the mechanism based at least on the continuously derived future data points for the plurality of time series-based data sets.

In specific embodiments of the computer program product, the second set of codes are further configured to cause the computer to implement a plurality of recurrent neural networks, each recurrent neural network receiving from one of the data streaming channels a corresponding one of the time series-based data sets to identify the one or more patterns and continuously derive the future data point for the corresponding time series data set. In related embodiments of the computer program product, the second set of codes are further configured to cause the computer to execute at least one Nonlinear Autoregressive Moving-Average (NARMA) model on the time series-based data sets to identify the one or more patterns and continuously derive the future data point for the corresponding time series data set. In other related embodiments of the computer program product, the second set of codes are further configured to cause the computer to feed back the derived future data points as inputs to the NARMA model to account for historical data dependency of the data points in the time series-based data sets.

In still further specific embodiments of the computer program product, the third set of codes are further configured to cause the computer to implement one or more multi-variate regression analysis algorithms to determine the dynamic derived value variable for the mechanism based at least on the continuously derived future data points for the plurality of time series-based data sets. In related embodiments of the computer program product, the third set of codes are further configured to cause the computer to determine and assign dynamic weighting factors to each of the continuously derived future data points for the plurality of time series-based data sets to determine the dynamic derived value variable for the mechanism. The dynamic weighting factor indicates a level of importance of a corresponding time series-based data sets at points in time.

Thus, according to embodiments of the invention, which will be discussed in greater detail below, the present invention provides for streaming data channels to inject time series-based data sets into a private cloud platform at which complex event processing engines implementing a recurrent neural network (RNN) using a Nonlinear Autoregressive Moving-Average (NARMA) model identify patterns in the data sets to determine dynamic predictive data points/values for each data set. The dynamic predictive data points/values serve as inputs to machine learning engines, which implement multi variate regression analysis to derive a dynamic variable value for a mechanism.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
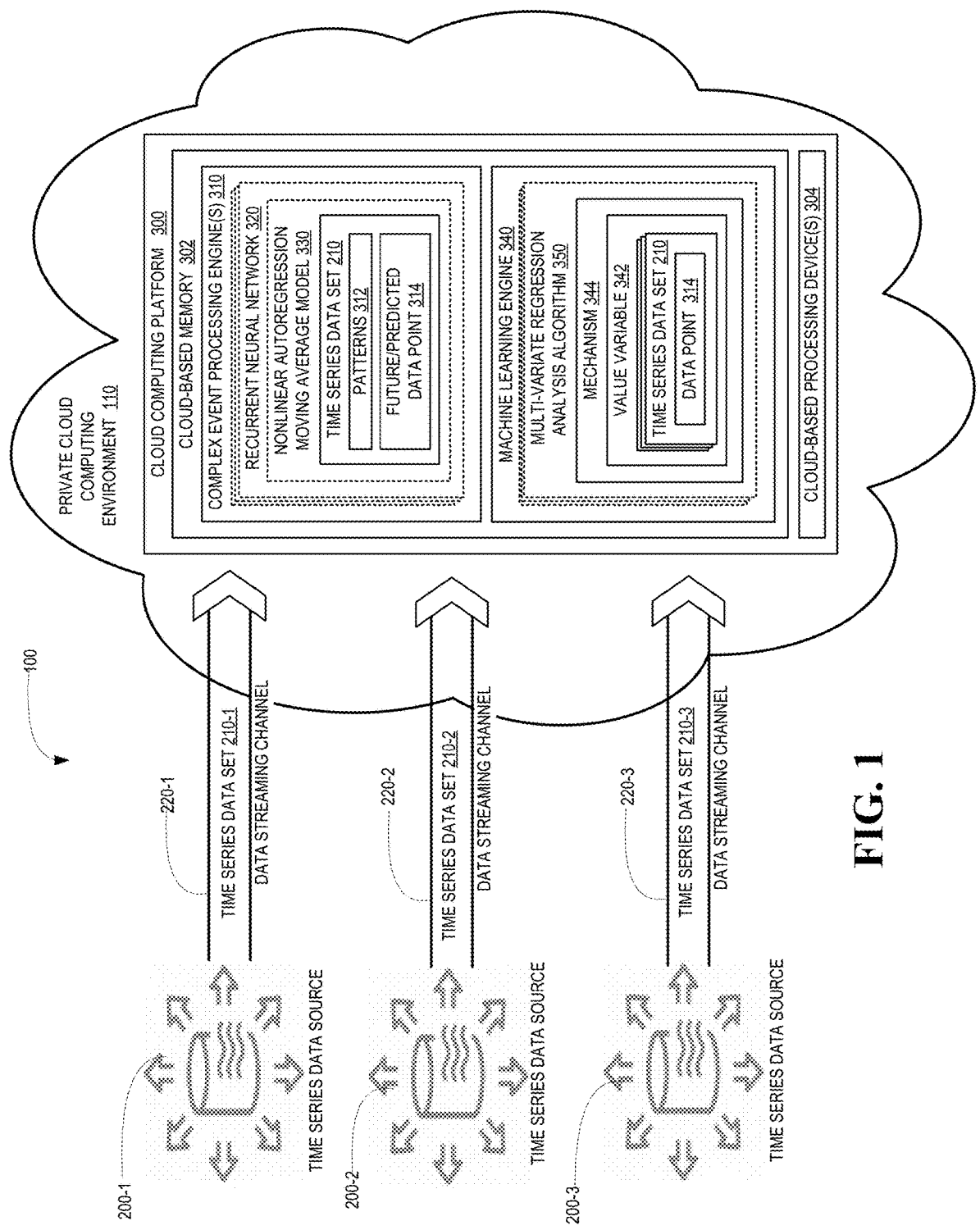
Figure 2:
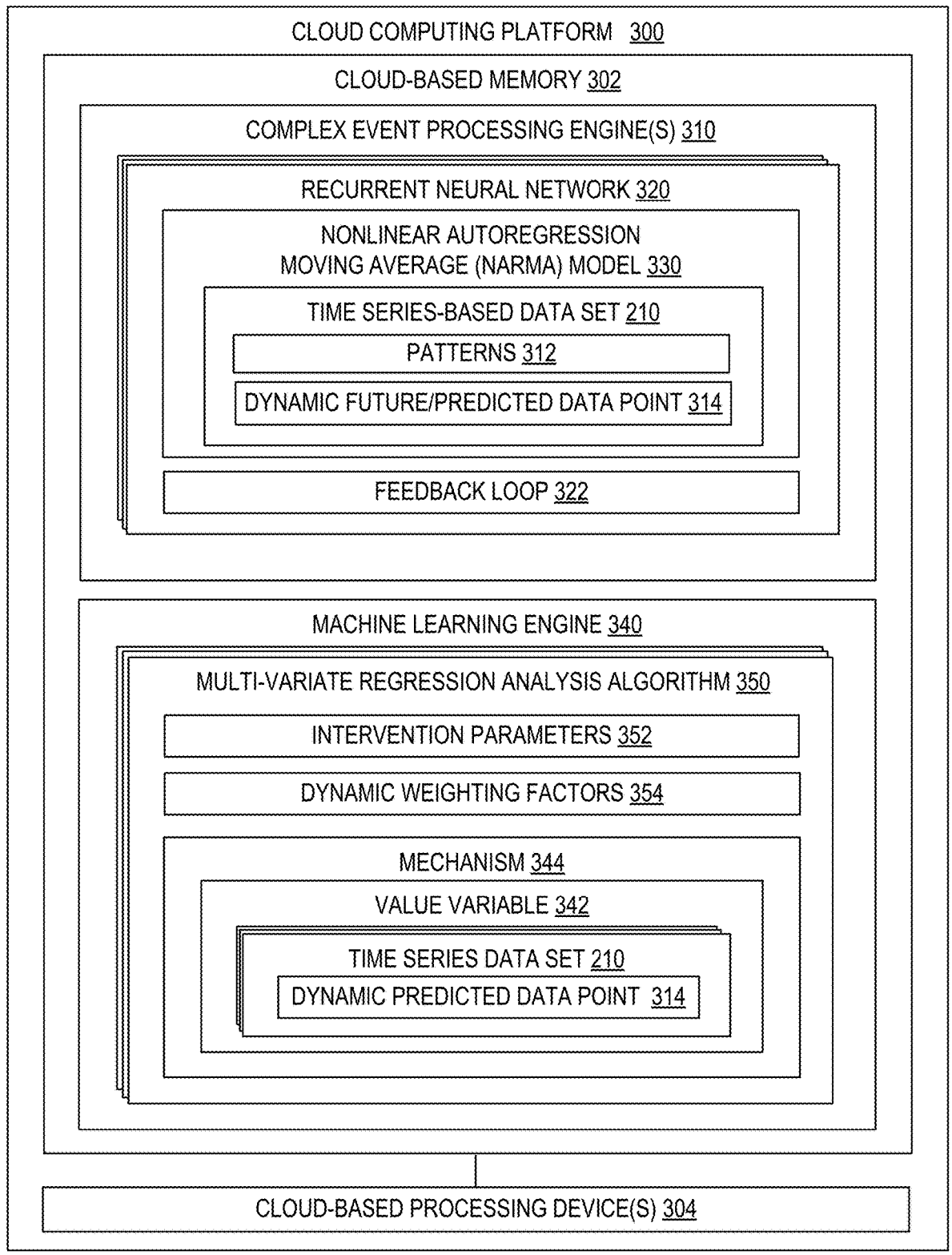
Figure 3:
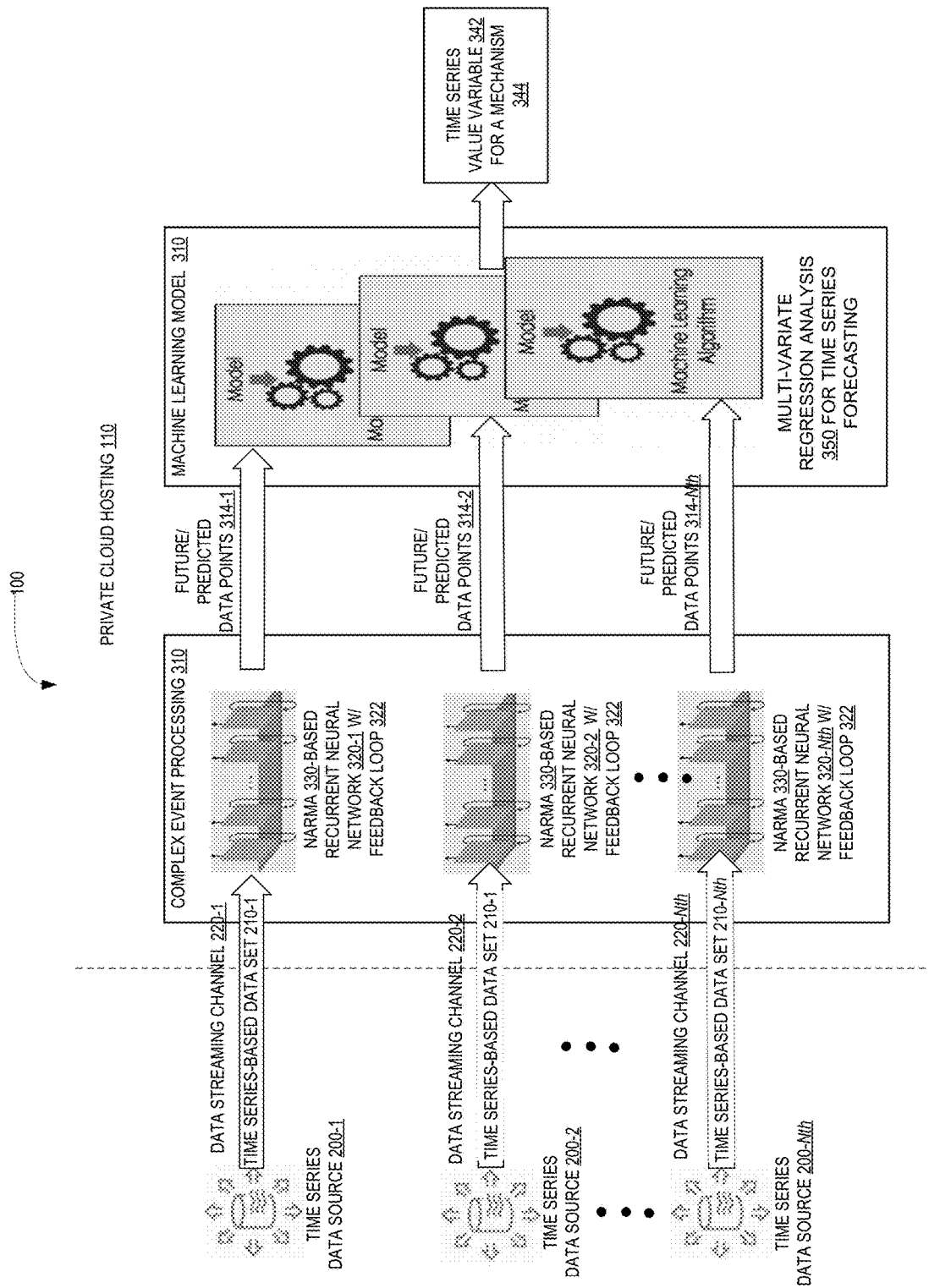
Figure 4:
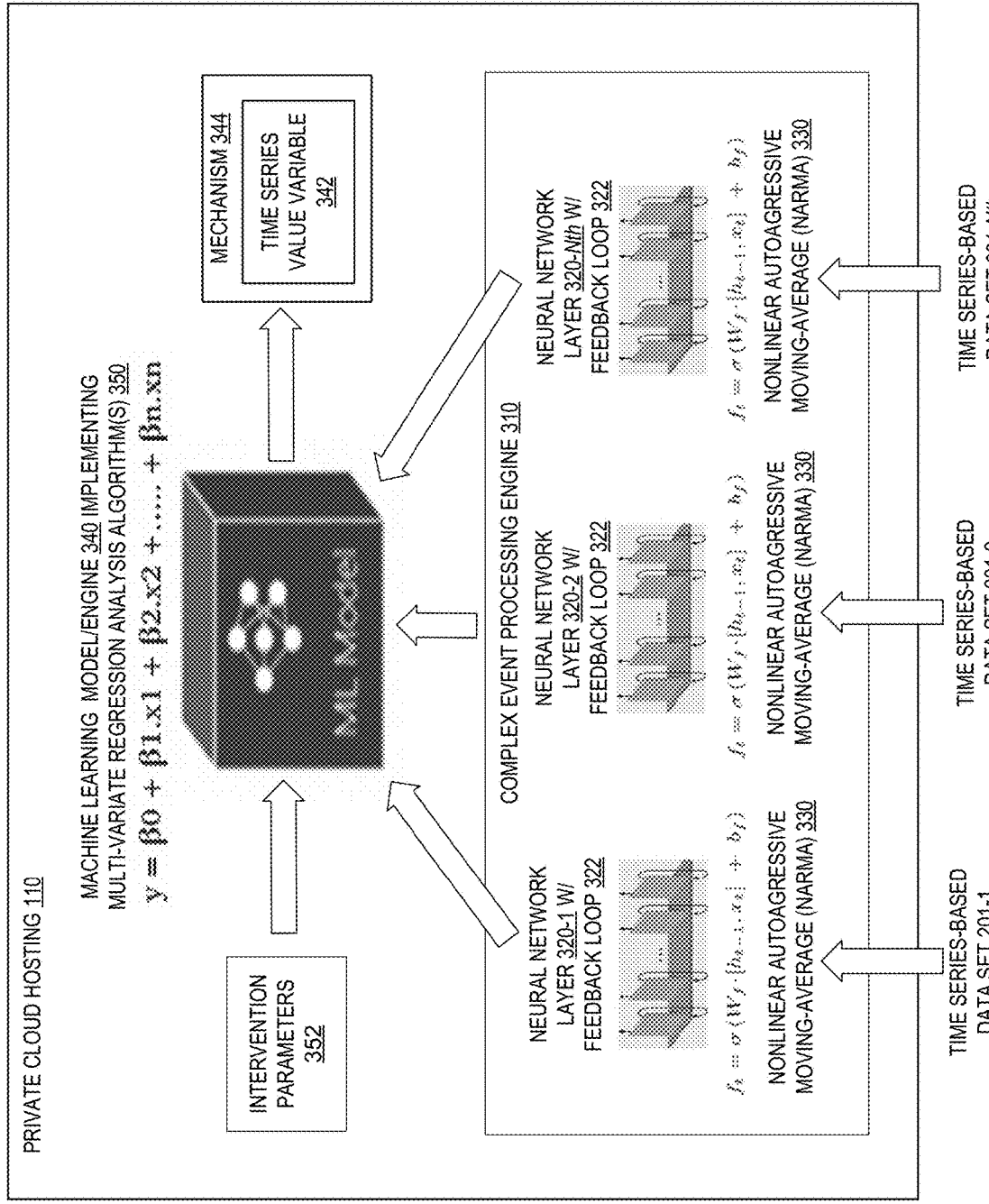
Figure 5:
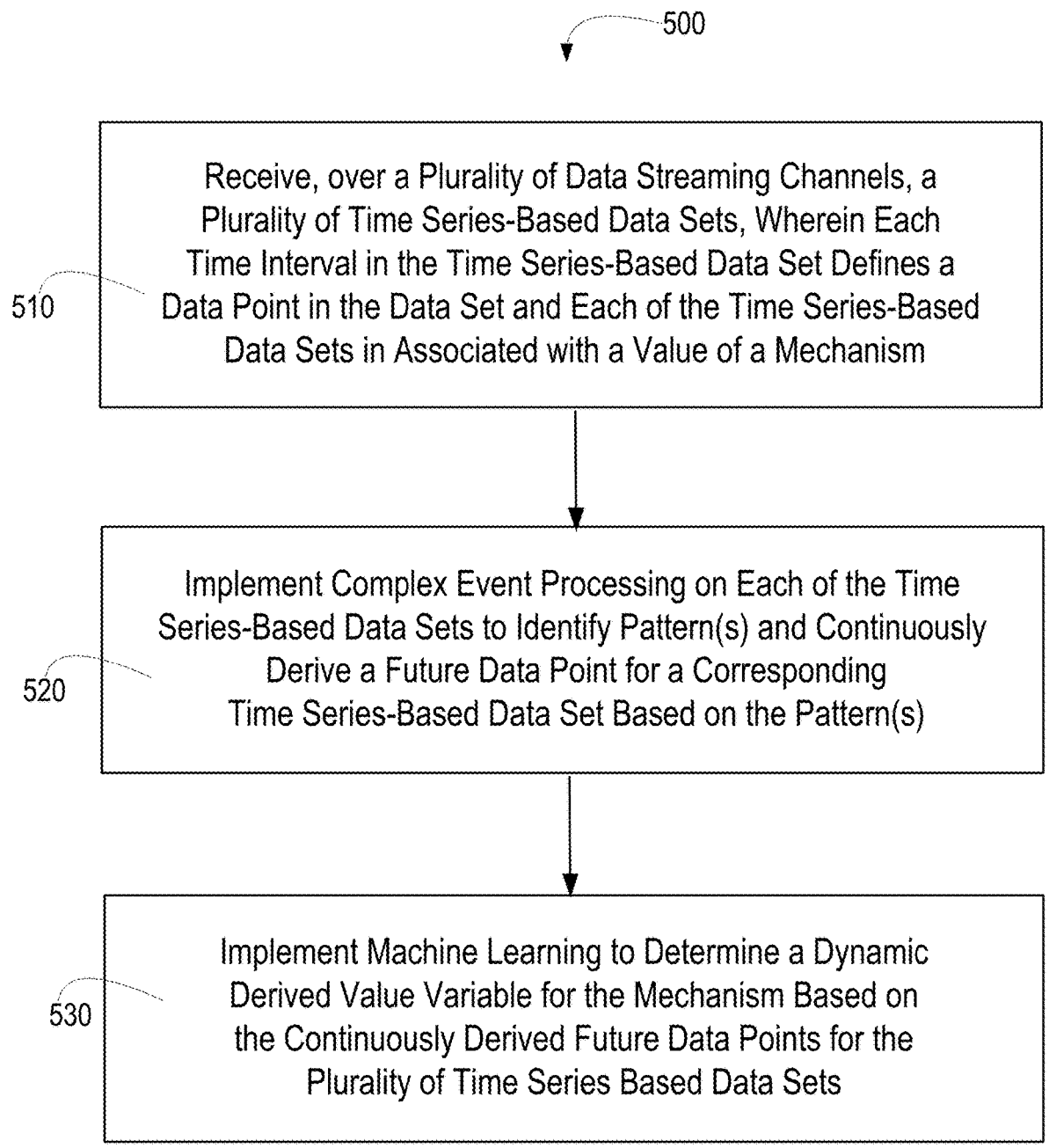

Having thus described embodiments of the disclosure in general terms, reference will now be made to the accompanying drawings, wherein:

FIG. 1 is a schematic/block diagram of a system for determining a dynamic derived value variable for a mechanism, in accordance with embodiments of the present invention;

FIG. 2 is a block diagram of a cloud-based computing platform for determining a dynamic derived value variable for a mechanism, in accordance with embodiments of the present invention;

FIG. 3 is a schematic diagram of a system and process flow for determining a dynamic derived value variable for a mechanism, in accordance with embodiments of the present invention;

FIG. 4 is a schematic diagram of a system and process flow highlighting additional features for determining a dynamic derived value variable for a mechanism, in accordance with embodiments of the present invention; and FIG. 5 is a flow diagram of a method for determining a dynamic derived value variable for a mechanism, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below that provide for cloud-based implementation of complex event processing engines on time series based data sets to determine dynamic predictive data points and implementation of machine learning engines to derive time series based dynamic/real-time value variables for a mechanism.

As a means of receiving time-series data sets that require consumption/processing at high-speed (i.e., millions of messages per minute rate), the present invention provides for data streaming channels to act as data injectors for providing time series based and other data sets to a privately hosted cloud computing platform. As previously discussed, the private cloud-based computing platform affords heightened data security.

The cloud computing platform implements complex event processing (CEP) engine(s) to identify patterns in the streaming time series data sets and determine dynamic future/predicted data points for the data sets based on the patterns. In specific embodiments of the invention, the CEP implements a recurrent neural network using a highly accurate Nonlinear Autoregressive Moving-Average (NARMA) model for forecasting/predicting the time series data. The dependency of the prior state of the data series means that by leveraging a feedback loop within the recurrent neural network the next forecasted data point/value can be derived for the time series data set.

In addition, the cloud-based computing platform implements machine learning engines, in specific embodiments of the invention, multi variate regression analysis algorithm(s), which use multiple input parameters as decision making parameters for the value variable being determined/predicted. The various inputs parameters, which include the forecasted data points/values of the various time series-based data sets and other intervention parameters are assigned dynamic weighting factors for the multi variate regression analysis, The interpretation of the multivariate model provides the impact for each independent variable/input parameter on the dependent variable (i.e., predicted value of a mechanism).

Referring to FIG. 1, a system 100 is depicted for dynamically determining a value variable for a mechanism, in accordance with embodiments of the present invention. The system 100 is implemented in cloud computing environment 110, in specific embodiments a private cloud computing environment 110. The system 100 includes a plurality of data streaming channels 220-1, 220-2, 220-3 and the like, which are configured to stream time-series-based data sets 210-1, 210-2, 210-3 and the like from their respective time-series data sources 200-1, 200-2, 200-3 and the like to the private cloud computing environment 110. While three data streaming channels, 220-1, 220-2, 220-3 and corresponding time-series-based data sets 210-1, 210-2, 210-3 and data sources 200-1, 200-2, 200-3 are shown in FIG. 1, those of ordinary skill in the art will appreciate that in most instances many more data streaming channels 220 will be required to support many more different time series-based data sets 210 required to accurately determine the dynamic value variable for a specific mechanism. As previously discussed, time series-based data is data that changes frequently over time intervals, such as every millisecond or the like. As such, each time interval in the time series of a corresponding time series-based data set 210-1, 210-2, 210-3 defines a data point in the data set. Moreover, each of the time series-based data sets 210-1, 210-2, 210-3 is associated with a value of a mechanism. The data streaming channels 220-1, 220-2, 220-3 are synchronized, such that, at any point in time, subsequent processing that occurs in the private cloud computing environment 110 on the plurality of time series-based data sets 210-1, 210-2, 210-3 is synchronized in time.

For embodiments of the invention in which the mechanism for which the variable value is being determined is a financial product, the time based-series data may be equity prices, industry/financial products, currency exchange rates, interest rates, stock indices, financial transactions (e.g., trades, loans, deposits/withdrawals and the like). In addition, other macro-economic factors and indicators may be included as time series-based data, such as, but not limited to employment data, industrial indicators, and the like. Additionally, other data, which may or may not be time series based may also be used in determining the dynamic value variable for the mechanism including, but not limited to, general and financial news data.

It should be noted that the data streaming channels 220 are configured to stream the time series-based data sets 210 from the data sources 200 to the private cloud computing environment 110 via a distributed communication network (not shown in FIG. 1), such the Intranet, one or more private intranets, cellular networks or the like.

The system additionally includes a cloud computing platform 300, which includes cloud-based memory 302 and one or more cloud-based processing devices 304 that are in communication with the cloud-based memory 302. The cloud-based memory 302 stores a complex event processing engine 310 that is executable by the one or more cloud-based processing devices 304 to identify one or more patterns 312 within each on the individual time series-based data sets 210-1, 210-2, 210-3 and continuously derive a future/predicted data point 314 for a corresponding time series-based data sets 210-1, 210-2, 210-3 based on the pattern(s) 312. Complex event processing is are known in the art, is an organizational tool that aids in aggregating different information and that identifies and analyzes cause-and-effect relationships among events in real time. CEP matches continuously incoming events against a pattern and provides insight into what is happening.

In specific embodiments of the system, the complex event processing engines 310 are implemented amongst recurrent neural networks 320. A recurrent neural network (RNN), as is known in the art, is a type of artificial neural network commonly used to recognize a data's sequential characteristics and use patterns to predict the next likely scenario. RNNs are used in deep learning and in the development of models that simulate the activity of neurons. In the present invention, each node in the neural network holds a value for a particular time interval ($t_1$, $t_2$, $t_3$ and the like) with the more recent values being afforded higher weightage in forecasting the future/predicted data points 314 for a given time series-based data set 210.

Recurrent neural networks are especially powerful in use cases in which context is critical to predicting an outcome and are distinct from other types of artificial neural networks because they use feedback loops to process a sequence of data that informs the final output, which can also be a sequence of data. These feedback loops allow information to persist; the effect is often described as memory. The use of feedback loops within the recurrent neural networks 320 is discussed in more detail below in relation to FIG. 2.

In further specific embodiments of the invention, the recurrent neural networks 320 use a Nonlinear Autoregressive Moving-Average (NARMA) model 330 for forecasting the future/predicted data points 314. As previously discussed, a NARMA model provides a high degree of accuracy in time series forecasting. For statistical analysis of time series, auto-regressive moving-average models provide a parsimonious description of a stationary stochastic process in terms of two polynomials, one for the autoregression (AR) and the second for the moving-average (MA). Given a time series of data $X_t$, the auto-regressive moving-average model is a tool for understanding and predicting future values in the series. The AR part involves regressing the variable on its own lagged/past values. While the MA part involves modeling the error term as a linear combination or error terms occurring contemporaneously and at various times in the past. For the present invention nonlinear ARMA is preferred due to the discreteness of the data in the time series-based data sets.

Additionally, cloud-based memory 310 stores machine learning engine 340 that is executable by the cloud-processing device(s) 304 and configured to determine a dynamic value variable 342 for a mechanism 344 based at least on the continuously derived future/predicted data points 314 of each of the plurality of time-series data sets 210-1, 210-2, 210-3. As previously discussed, in specific embodiments of the invention in which the mechanism 344 is a financial product, such as stock, stock fund, exchange rate or the like, the value variable 342 is used to subsequently set an offer price for offering the financial product to clients for a designated period of time. In specific embodiments of the invention, the machine learning engine 340 implements one or more multi-variate regression analysis algorithms to determine the dynamic value variable for the mechanism. Multi-variate regression analysis is a supervised learning algorithm, which in contrary to linear regression, uses multiple input parameters as decision making parameters for the value variable being predicted. Multi-Variate regression analysis involves analyzation of multiple data variables; one dependent variable and multiple independent variables. Based on the number of independent variables, multi-Variate regression analysis predicts the output. Multivariate regression tries to find out a formula that can explain how factors in variables respond simultaneously to changes in other variables.

Referring to FIG. 2, a block diagram is depicted of a cloud computing platform 300 configured for determining dynamic value variables for mechanisms, in accordance with various alternate embodiments of the invention. Specifically, FIG. 2 provides greater detail and highlights various alternative embodiments of the invention. Cloud computing platform 300, may comprise one or more cloud computing devices (e.g., application server(s), storage servers, or the like), is configured to execute software programs, including engines, instructions, algorithms, modules, routines, applications, tools and the like. Cloud computing platform 300 cloud memory 302, such as provided by a cloud storage service and/or a cloud connection service (e.g., object storage, file storage and the like).

Further, first computing apparatus 200 also includes one or more cloud-based processing devices 304, which may be application-specific integrated circuits ("ASIC"), or other chipset, logic circuit, or other data processing devices configured to execute the engines 310 and 340. Cloud-based processing devices 304 or the like may execute one or more application programming interface (APIs) (not shown in FIG. 2) that interface with any resident programs, such as complex event processing engine 310 and machine learning engine 340 or the like stored in the cloud-based memory 302 of the cloud computing platform 300. Cloud-based processing device(s) 304 may include various processing subsystems (not shown in FIG. 2) embodied in hardware, firmware, software, and combinations thereof, that enable the functionality of cloud computing platform 300 and the operability of cloud computing platform 300 with a distributed communications network. For example, processing subsystems allow for initiating and maintaining communications and exchanging data with other clouds or communication network or the like. For the disclosed aspects, processing subsystems of cloud computing platform 300 may include any processing subsystem used in conjunction with complex event processing engine 310 and machine learning engine 340 and related engines, tools, routines, sub-routines, algorithms, sub-algorithms, sub-modules thereof.

Cloud computing platform 300 additionally includes a communications module (not shown in FIG. 2) embodied in hardware, firmware, software, and combinations thereof, that enables electronic communications between cloud computing apparatus 300 and other network devices. Thus, the communication module may include the requisite hardware, firmware, software and/or combinations thereof for establishing and maintaining a network communication connection with one or more network devices or the like.

As previously discussed in relation to FIG. 1, cloud-based memory 302 stores complex event processing engine 210, which is executable by the one or more cloud-based processing devices 304. Complex event processing engine 310 is configured to identify one or more patterns 312 within each on the individual time series-based data sets 210-1, 210-2, 210-3 and continuously derive a future/predicted data point 314 for a corresponding time series-based data sets 210-1, 210-2, 210-3 based on the pattern(s) 312.

In specific embodiments of the system, the complex event processing engines 310 are implemented amongst recurrent neural networks 320. Recurrent neural network (RNN) 320 implement feedback loop 322 to account for historical data dependency of the data points in the time series-based data sets. For example, the value for the most recent time interval is fed back into the neural network via the feedback loop to account for dependency of the prior state of the data series that is being analyzed. In further specific embodiments of the invention, the recurrent neural networks 320 use a Nonlinear Autoregressive Moving-Average (NARMA) model 330 for forecasting the future/predicted data points 314. As previously discussed, a NARMA model provides a high degree of accuracy in time series forecasting.

Additionally, cloud-based memory 310 stores machine learning engine 340 that is executable by the cloud-processing device(s) 304 and configured to determine a dynamic value variable 342 for a mechanism 344 based at least on the continuously derived future/predicted data points 314 of each of the plurality of time-series data sets 210-1, 210-2, 210-3. As previously discussed, in specific embodiments of the invention in which the mechanism 344 is a financial product, such as stock, stock fund, exchange rate or the like, the value variable 342 is used to subsequently set an offer price for offering the financial product to clients for a designated period of time.

In specific embodiments of the invention, the machine learning engine 340 implements one or more multi-variate regression analysis algorithms 350 to determine the dynamic value variable for the mechanism. Multi-Variate regression analysis involves analyzation of multiple data variables. In the present invention, in addition to output of the complex event processing engine 310 (i.e., the continuous future/predicted data points 314 for each of the time series-based data sets 210), the multi data variables used by the multivariate regression analysis algorithms 350 include intervention parameters 352. In those embodiments of the invention in which the mechanism 344 is a financial product, the intervention parameters 352 may include data from traders or other businesses aligned with the financial product.

In addition, the multi-variate regression analysis algorithms 350 is configured to rely on dynamic weighting factors 354 that are applied to the dynamic future/predicted data points 314. In specific embodiments of the invention, the dynamic weighting factors 354 are continuously determined by the machine learning engine 340 or some other engine/algorithm within the cloud computing platform 300. The weighting factors 354 are based on the level of importance that a specific data point 314 has in the determination of the value variable 342. The dynamic nature of the weighting factor 354 takes into account that the importance of the data points 314 will change over time.

Referring to FIG. 3, a schematic diagram is depicted of a system 100 for dynamic determination of a value variable for a mechanism, in accordance with embodiments of the invention. The system includes a plurality of data streaming channels 220-1, 220-2, 220-Nth that are configured to stream time-series based data sets 210-1, 210-2, 210-Nth from time-series data sources 200-1, 200-2, 200-Nth to the complex event processing engine 310 of the private cloud computing environment 110.

Within the complex event processing engine 310 of the private cloud computing environment 110 the individual streams of data sets 210-1, 210-2, 210-Nth are received by the Nonlinear Autoregressive Moving-Average (NARMA) 330 based recurrent neural networks 320-1, 320-2, 320-Nth that implement feedback loops 322. Each node of a corresponding recurrent neural networks 320-1, 320-2, 320-Nth holds a value for a particular time, with the most recent value given the highest weightage for forecasting a future/predicted value 314 shown in FIGS. 1 and 2) based on patterns 312 identified by the NARMA model 330. The feedback loop 322 is configured to account for account for historical data dependency of the data points in the time series-based data sets, such that the most recent time series value from the final node in the recurrent neural network 320-1, 320-2, 320-Nth is fed back to the first node in the recurrent neural network 320-1, 320-2, 320-Nth.

The future predicted data points 314-1, 314-2, 314-Nth serve as one dependent input to the machine learning model 310 which implements multi-variate regression analysis 350 for time-series forecasting of a dynamic value variable 342 of a predetermined mechanism 344.

As previously discussed, multi-variate regression analysis 350 is a supervised learning algorithm, which in contrary to linear regression, uses multiple input parameters as decision making parameters for the value variable 342 being predicted.

Referring to FIG. 4 a schematic diagram is shown of a private cloud hosting environment 110 for dynamic determination of a value variable for a mechanism, in accordance with embodiments of the present invention. Time series-based data sets 210-1, 210-2, 210-Nth are streamed into a complex event processing engine 310 that utilizes a neural network 320 with a feedback loop 322 (i.e., a recurrent neural network or the like). The feedback loop takes into account the historical data dependency of the data points in the time series-based data sets. The neural network layer 320 uses a nonlinear autoregressive moving-average (NARMA) model 330 based on the function $f_t = \sigma(W_f[h_{t-1}, x_t] + b_f)$ to identify patterns in the time series data sets 210-1, 210-2, 210-Nth and continuously derive future/predicted data points/values for each corresponding data set 210-1, 210-2, 210-Nth.

The outputs of the complex event processing engine 310 (i.e., the continuous derived future/predicted data points/values are inputted into the machine learning engine 340, along with other intervention parameters 352 and multi-variate regression analysis is performed based on the function $y=\beta 0+\beta 1.x1+\beta 2.x2+ \ldots \beta n.xn$, where y is the value variable, $\beta$ is the assigned/determined weighting factor and x is predicted data point value for a specified data set (1, 2, ... n) and $\beta 0$ global weighting factor at the model level independent of and data set. As result of the multi-variate regression analysis a dynamic value variable 342 is derived for the mechanism, which in the financial product embodiment can be used to effectively set an offer price for the financial product that is valid for a specified period of time in the future (e.g., next 30 minutes, next hour or the like).

Referring to FIG. 5, a flow diagram is depicted of a method 500 for dynamically determining a value variable for a mechanism, in accordance with embodiments of the present invention. At Event 510, a plurality of time-series based data sets are received over corresponding ones of a plurality of data streaming channels. Time series-based data is data that changes, typically frequently, over time intervals, such as every millisecond or the like. As such, each time interval in the time series of a corresponding time series-based data set defines a data point or value in the data set. Moreover, each of the time series-based data sets are associated with a value of a mechanism.

For embodiments of the invention in which the mechanism for which the variable value is being determined is a financial product, the time based-series data may be equity prices, industry/financial products, currency exchange rates, interest rates, stock indices, financial transactions (e.g., trades, loans, deposits/withdrawals and the like). In addition, other macro-economic factors and indicators may be included as time series-based data, such as, but not limited to employment data, industrial indicators, and the like. Additionally, other data, which may or may not be time series based may also be used in determining the dynamic value variable for the mechanism including, but not limited to, general and financial news data.

At Event 520 complex event processing is implemented on each of the time series-based data sets to identify patterns and continuously derive a future/predicted data point/value for the corresponding data set. As previously discussed, in specific embodiments of the method, the complex event processing may involve a recurrent neural network using a nonlinear autoregressive moving-average (NARMA) model. The recurrent nature of the neural network provides for a feedback loop to take into account the historical data dependency of the data points in the time series-based data sets.

At Event 530, machine learning is implemented to determine a dynamic derived value variable for the mechanisms based at least on the inputs being the continuously derived future/predicted data points for each of the data sets. As previously discussed, in specific embodiments of the invention, the machine learning algorithms implement multi-variate regression analysis for time series forecasting that results in the dynamic value variable for the mechanism.

Thus, present embodiments of the invention provide systems, methods, computer program products and/or the like for determining dynamic value variables for mechanisms, such as financial products or the like. Specifically, as discussed, streaming data channels are provided which inject time series-based data sets into a private cloud platform at which complex event processing engines implementing a recurrent neural network (RNN) using a Nonlinear Autoregressive Moving-Average (NARMA) model identify patterns in the data sets to continuously determine dynamic predictive data points/values for each data set. The dynamic predictive data points/values serve as inputs to machine learning engines, which implement multi variate regression analysis to derive a dynamic variable value for the associated mechanism.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for determining a dynamic derived value variable for a mechanism, the system comprising:
    a cloud computing platform including a cloud-based memory and at least one cloud-based processing device in communication with the cloud-based memory;
    a plurality of data streaming channels in communication with the cloud computing platform, each data streaming channel configured to stream one of a plurality of time series-based data sets to the cloud computing platform, wherein each time interval in the time series of a corresponding time series-based data set defines a data point in the data set and each of the time series-based data sets is associated with a value of a mechanism, wherein each data streaming channel is configured to stream via a distributed communication network comprising one or more private intranets and the plurality of data streaming channels is synchronized to cause subsequent processing of the plurality of time series-based data in the cloud computing platform to be time-synchronized;
    one or more complex event processing engines stored in the cloud-based memory and executed by the least one cloud-based processing device on each of the time series-based data sets to identify one or more patterns and continuously derive a future data point for a corresponding time series data set based at least on the one or more patterns; and
    one or more machine-learning engines stored in the cloud-based memory and executed by the least one cloud-based processing device to determine the dynamic derived value variable for the mechanism based at least on the continuously derived future data points for the plurality of time series-based data sets, wherein the dynamic derived value variable for the mechanism is determined by implementing one or more multi-variate regression analysis algorithms to dynamically determine and assign dynamic weighting factors to each of the continuously derived future data points for the plurality of time series-based data sets, wherein the dynamic weighting factor indicates a level of importance of a corresponding time series-based data sets at points in time, wherein the one or more multi-variate regression analysis algorithms evaluate output from the one or more complex event processing engines and intervention parameters, wherein the mechanism comprises a product and the intervention parameters comprise data from one or more sources associated with the product.

2. The system of claim 1, wherein the one or more complex event processing engines further comprise a plurality of recurrent neural networks executed by the at least one cloud-based processing device, each recurrent neural network receiving from one of the data streaming channels a corresponding one of the time series-based data sets to identify the one or more patterns and continuously derive the future data point for the corresponding time series data set.

3. The system of claim 2, wherein the plurality of recurrent neural networks implement at least one Nonlinear Autoregressive Moving-Average (NARMA) model on the time series-based data sets to identify the one or more patterns and continuously derive the future data point for the corresponding time series data set.

4. The system of claim 3, wherein each of the plurality of recurrent neural networks further comprise a feedback loop to account for historical data dependency of the data points in the time series-based data sets.

5. The system of claim 1, further comprising a second computing platform including a second memory and at least one second processing device in communication with the second memory; and
    an offer determining engine stored in the second memory and executed by the at least one second processing device to determine an offer value for the mechanism, wherein the offer value covers a predetermined time period and is based at least on the dynamic derived value variable.

6. A computer-implemented method for determining a dynamic derived value variable for a mechanism, the method executed by one or more cloud-based computing processors and comprising:
    receiving, over a plurality of data streaming channels, a plurality of time series-based data sets, wherein each time interval in the time series of a corresponding time series-based data set defines a data point in the data set and each of the time series-based data sets is associated with a value of a mechanism, wherein each data streaming channel is configured to stream via a distributed communication network comprising one or more private intranets and the plurality of data streaming channels is synchronized to cause subsequent processing of the plurality of time series-based data in the cloud computing platform to be time-synchronized;
    implementing complex event processing on each of the time series-based data sets to identify one or more patterns and continuously derive a future data point for a corresponding time series data set based at least on the one or more patterns; and
    implementing machine learning including one or more multi-variate regression analysis algorithms to determine the dynamic derived value variable for the mechanism based at least on the continuously derived future data points for the plurality of time series-based data sets, wherein the one or more multi-variate regression analysis are implemented to dynamically determine and assign dynamic weighting factors to each of the continuously derived future data points for the plurality of time series-based data sets, wherein the dynamic weighting factor indicates a level of importance of a corresponding time series-based data sets at points in time, wherein the one or more multi-variate regression analysis algorithms evaluate output from the one or more complex event processing engines and intervention parameters, wherein the mechanism comprises a product and the intervention parameters comprise data from one or more sources associated with the product.

7. The computer-implemented method of claim 6, wherein implementing complex event processing further comprises implementing a plurality of recurrent neural networks, each recurrent neural network receiving from one of the data streaming channels a corresponding one of the time series-based data sets to identify the one or more patterns and continuously derive the future data point for the corresponding time series data set.

8. The computer-implemented method of claim 7, wherein implementing the plurality of recurrent neural networks further comprises executing at least one Nonlinear Autoregressive Moving-Average (NARMA) model on the time series-based data sets to identify the one or more patterns and continuously derive the future data point for the corresponding time series data set.

9. The computer-implemented method of claim 8, wherein implementing the plurality of recurrent neural networks further comprises feeding back the derived future data points as inputs to the NARMA model to account for historical data dependency of the data points in the time series-based data sets.

10. A computer program product comprising:
a non-transitory computer-readable medium comprising:
a first set of codes for causing a computer to receive, over a plurality of data streaming channels, a plurality of time series-based data sets, wherein each time interval in the time series of a corresponding time series-based data set defines a data point in the data set and each of the time series-based data sets is associated with a value of a mechanism, wherein each data streaming channel is configured to stream via a distributed communication network comprising one or more private intranets and the plurality of data streaming channels is synchronized to cause subsequent processing of the plurality of time series-based data in a cloud computing platform to be time-synchronized;
a second set of codes for causing a computer to implement complex event processing on each of the time series-based data sets to identify one or more patterns and continuously derive a future data point for a corresponding time series data set based at least on the one or more patterns; and
a third set of codes for causing a computer to implement machine learning including one or more multi-variate regression analysis algorithms to determine the dynamic derived value variable for the mechanism based at least on the continuously derived future data points for the plurality of time series-based data sets, wherein the one or more multi-variate regression analysis are implemented to dynamically determine and assign dynamic weighting factors to each of the continuously derived future data points for the plurality of time series-based data sets, wherein the dynamic weighting factor indicates a level of importance of a corresponding time series-based data sets at points in time, wherein the one or more multi-variate regression analysis algorithms evaluate output from the one or more complex event processing engines and intervention parameters, wherein the mechanism comprises a product and the intervention parameters comprise data from one or more sources associated with the product.

11. The computer program product of claim 10, wherein the second set of codes are further configured to cause the computer to implement a plurality of recurrent neural networks, each recurrent neural network receiving from one of the data streaming channels a corresponding one of the time series-based data sets to identify the one or more patterns and continuously derive the future data point for the corresponding time series data set.

12. The computer program product of claim 11, wherein the second set of codes are further configured to cause the computer to execute at least one Nonlinear Autoregressive Moving-Average (NARMA) model on the time series-based data sets to identify the one or more patterns and continuously derive the future data point for the corresponding time series data set.

13. The computer program product of claim 12, wherein the second set of codes are further configured to cause the computer to feed back the derived future data points as inputs to the NARMA model to account for historical data dependency of the data points in the time series-based data sets.

* * * * *